United States Patent [19]
Gorzelski et al.

[11] Patent Number: 6,134,192
[45] Date of Patent: Oct. 17, 2000

[54] COMBINED MULTIPLE COMPACT DISC PLAYER AND RADIO RECEIVER

[75] Inventors: Christopher L. Gorzelski, Royal Oak; Michael John Hudak, Garden City; Billy Franklin Norris, Jr., Dearborn; Ylldes Zeneli, Dearborn Heights; John Paul May, West Bloomfield; Liviu Mihail Nicola, Lincoln Park; David S. Wills, Dearborn, all of Mich.

[73] Assignee: Visteon Global Technologies, Inc., Dearborn, Mich.

[21] Appl. No.: 09/161,624

[22] Filed: Sep. 28, 1998

[51] Int. Cl.[7] .................................................. H04B 1/20
[52] U.S. Cl. ............................................ 369/2; 369/6
[58] Field of Search ........................... 369/6, 2–3, 5, 369/10, 1, 21, 12, 7, 11, 75.1; 455/345, 346, 347, 348–349; 340/825.24

[56] References Cited

U.S. PATENT DOCUMENTS

| | | |
|---|---|---|
| 4,181,823 | 1/1980 | DeLamoreaux et al. . |
| 4,218,775 | 8/1980 | Cox et al. . |
| 4,388,712 | 6/1983 | Timm . |
| 4,495,607 | 1/1985 | Nishida . |
| 4,542,490 | 9/1985 | Shimizu et al. . |
| 5,130,961 | 7/1992 | Namiki et al. ........................ 369/6 |
| 5,195,065 | 3/1993 | Kato et al. ........................... 369/2 |
| 5,210,728 | 5/1993 | Noguchi et al. . |
| 5,235,568 | 8/1993 | Masaru . |
| 5,590,047 | 12/1996 | Uehara . |

FOREIGN PATENT DOCUMENTS

| | | |
|---|---|---|
| 10-031541 | 2/1998 | Japan . |
| 10-269688 | 10/1998 | Japan . |

*Primary Examiner*—Ali Neyzari
*Attorney, Agent, or Firm*—Mark L. Mollon

[57] ABSTRACT

A combined compact disc/radio system for an automobile includes a multiple compact disc player, a radio receiver, and a controller. The multiple compact disc player is provided with a magazine having n individual slots for storing n compact discs. The controller has a bezel provided with an eject button, a load button, n memory buttons each corresponding to a respective one of the slots, an information display area, and a single compact disc opening for inserting and removing compact discs from the multiple compact disc player. The memory buttons function as radio tuning preset station memory switches when the radio receiver is operating and function to identify slots to be loaded and unloaded when the multiple compact disc player is operating.

6 Claims, 6 Drawing Sheets

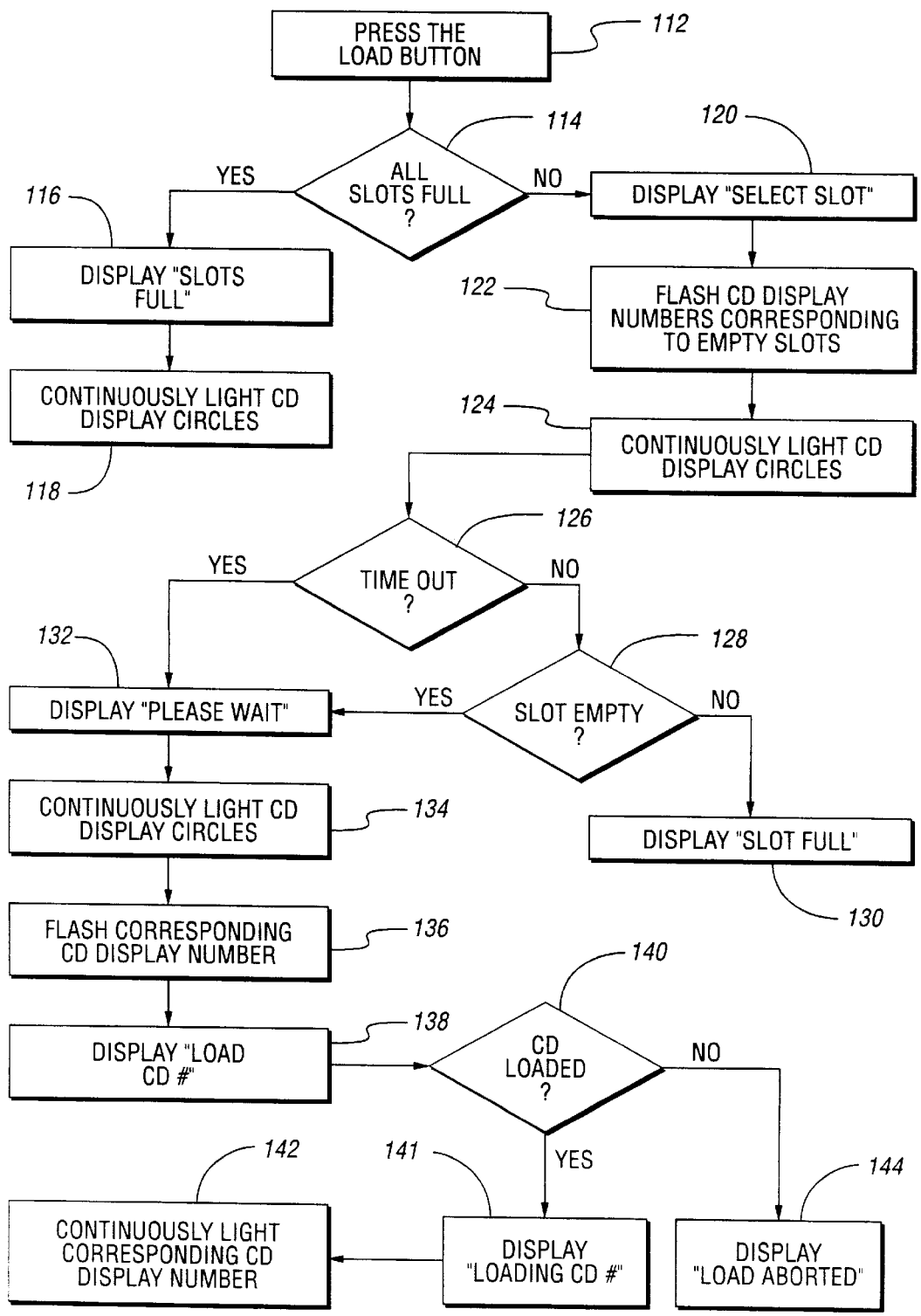

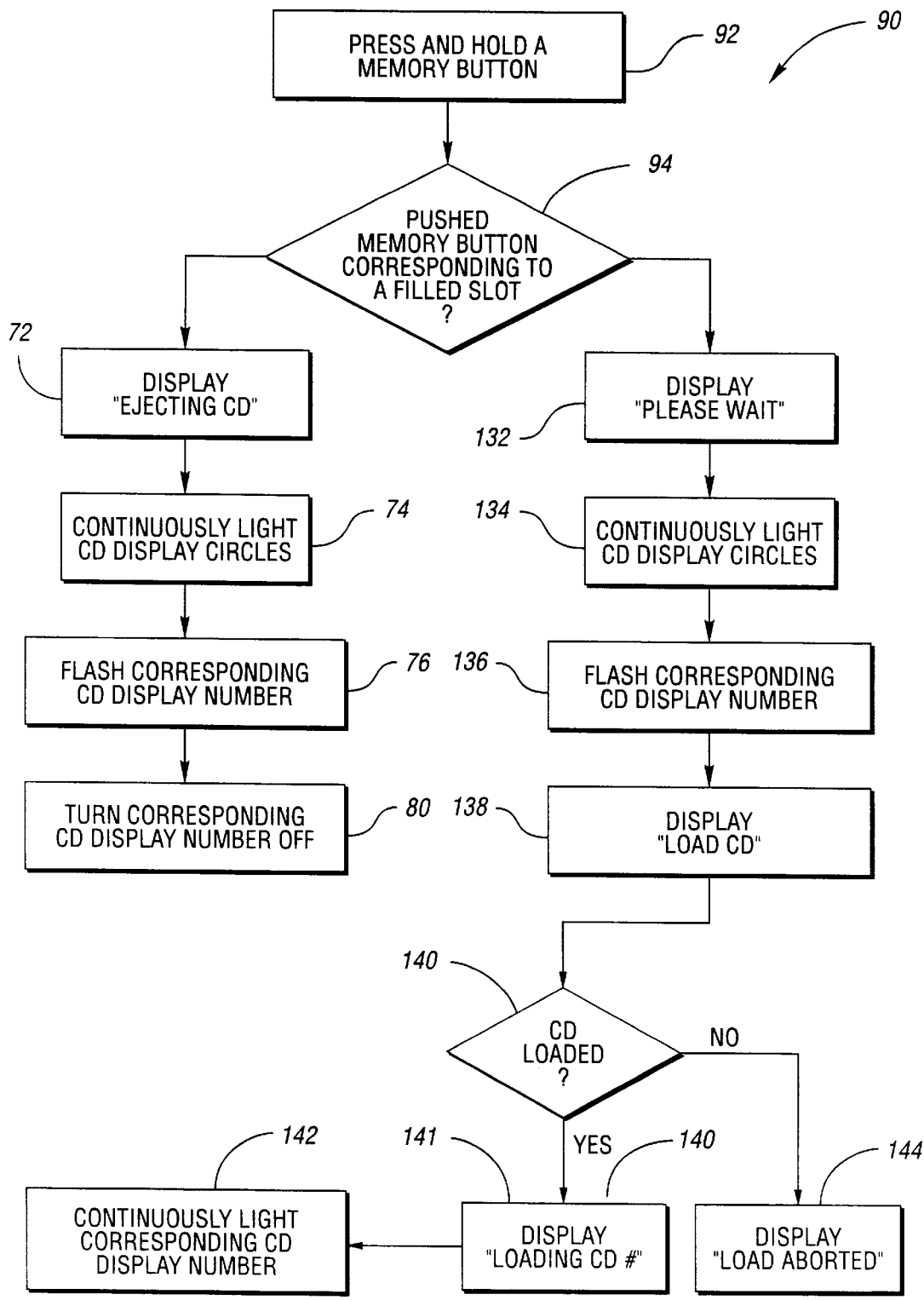

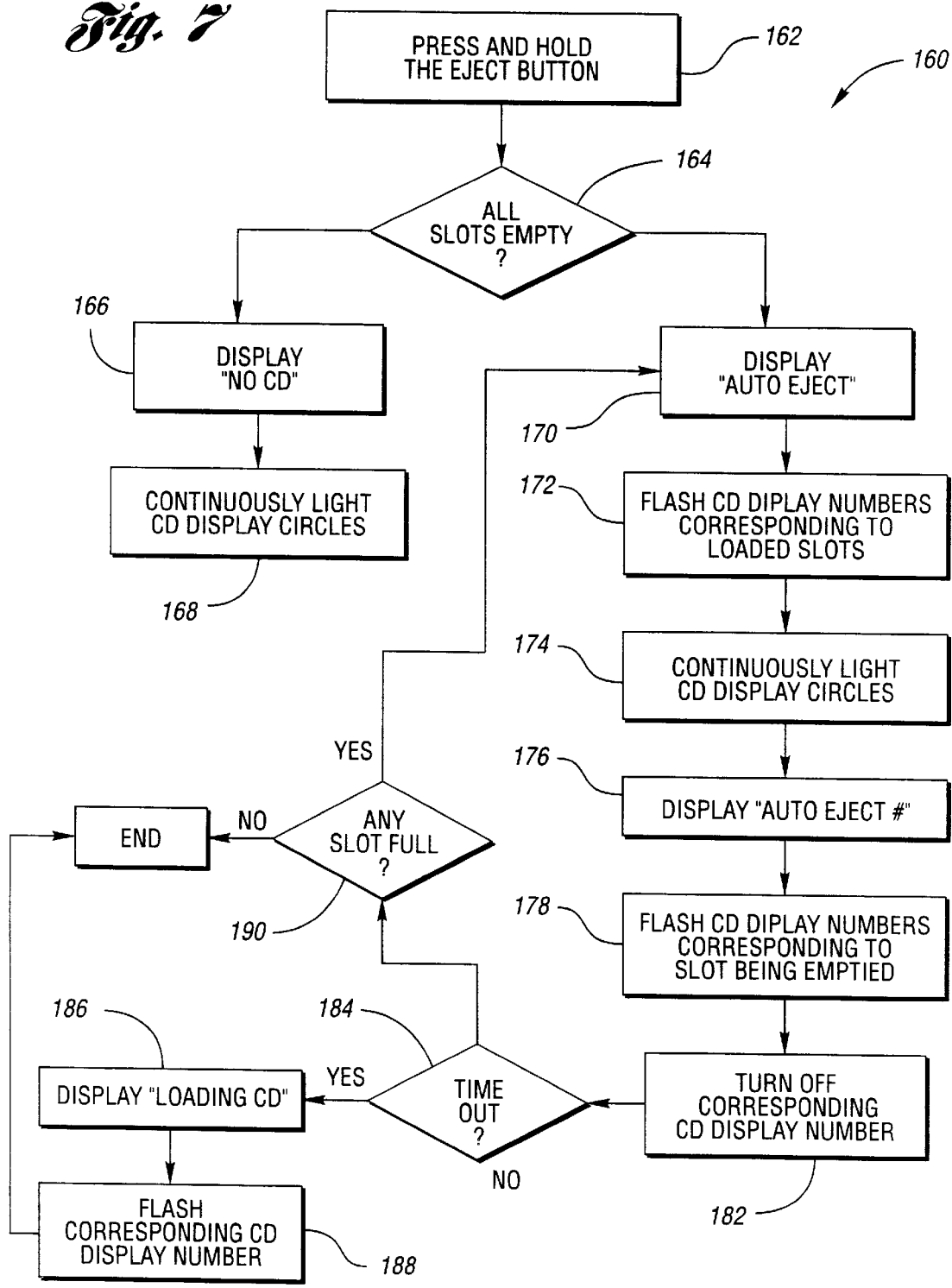

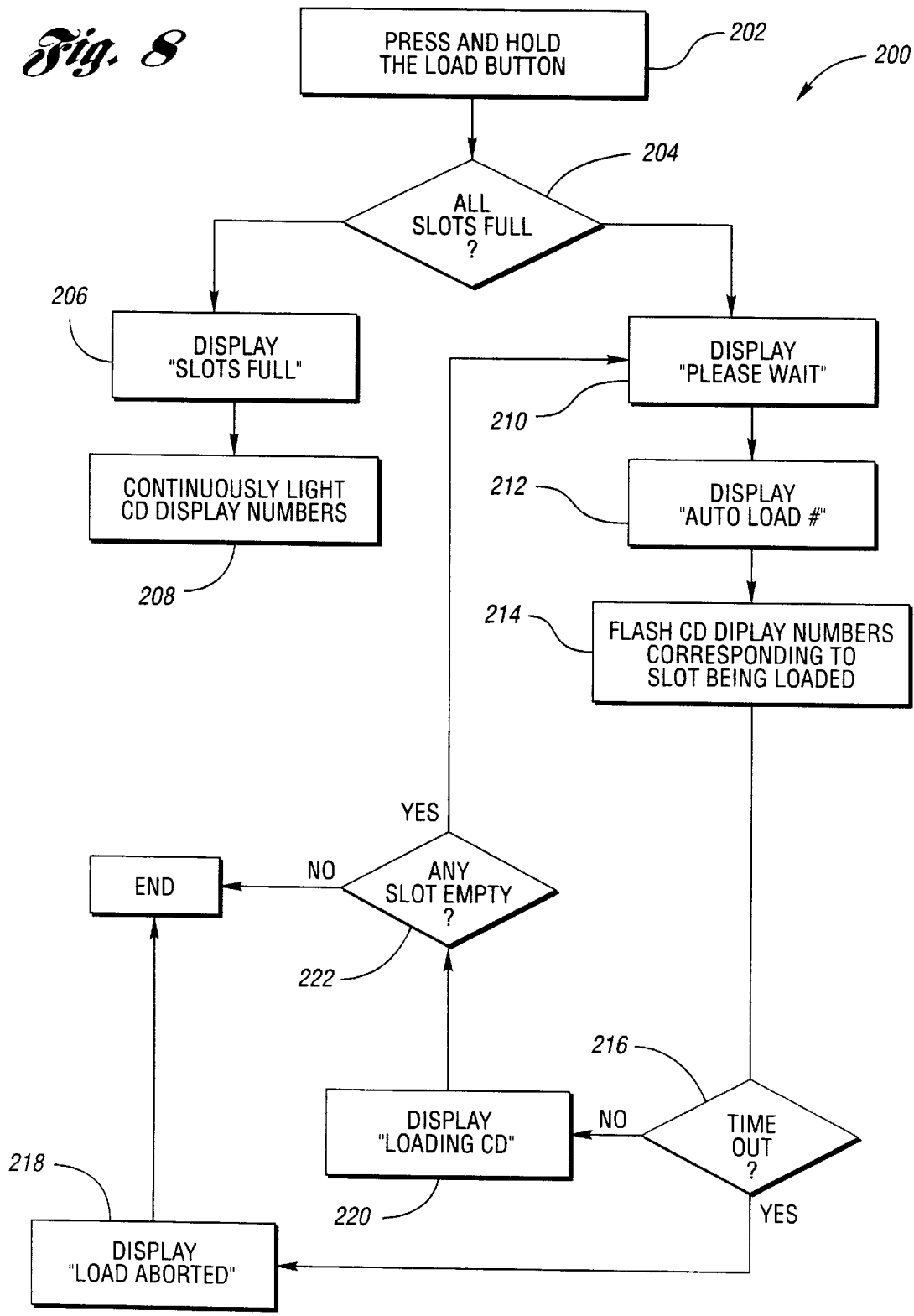

COMBINED MULTIPLE COMPACT DISC PLAYER AND RADIO RECEIVER

TECHNICAL FIELD

The present invention relates generally to compact disc players and radio receivers and, more particularly, to a combined multiple compact disc player and radio receiver for an automobile.

BACKGROUND ART

Generally, a radio receiver for an automobile has electronic tuning preset station memory switches. A user presets the memory switches to correspond to the favorite radio stations. Accordingly, by pressing a memory switch the radio receiver automatically tunes to the radio station corresponding to the selected switch.

Automobile radio receivers are now being combined with single compact disc (CD) players. Single CD players are able to store and play one CD at a time.

In-dash multiple CD players for automobiles such as the Fujitsu Ten six disc CD player are also available. A disadvantage associated with typical multiple CD players for automobiles is that they have a confusing method of operation and are separate units from the radio receiver.

DISCLOSURE OF THE INVENTION

A general object of the present invention is to provide a combined multiple CD player and radio receiver for an automobile.

In carrying out the above object and other objects, features, and advantages, the present invention provides a combined compact disc/radio system for an automobile. The system includes a multiple compact disc player, a radio receiver, and a controller. The multiple compact disc player is provided with a magazine having n individual slots for storing n compact discs. The controller has a bezel provided with an eject button, a load button, n memory buttons each corresponding to a respective one of the slots, an information display area, and a single compact disc slot for inserting and removing compact discs from the multiple compact disc player.

The memory buttons function as radio tuning preset station memory switches when the radio receiver is operating and function to identify slots to be loaded and unloaded when the multiple compact disc player is operating.

In accordance with the system of the present invention, methods of operating the system are also provided.

The advantages to the present invention are numerous. The present invention provides for compact disc insert, eject, auto insert, and auto eject using several different methods with only one additional button (the load button) than a standard one compact disc player and radio receiver combined system. This allows for user flexibility and an ergonomic bezel design. The present invention also provides display information to improve feedback for ease of use.

These and other features, aspects, and embodiments of the present invention will become better understood with regard to the following description, appended claims, and accompanying drawings.

BRIEF DESCRIPTION OF THE DRAWINGS

FIGS. 4–8 illustrate flow diagrams representing operation of the system and method in accordance with the present invention.

BEST MODES FOR CARRYING OUT THE INVENTION

Figure 1:
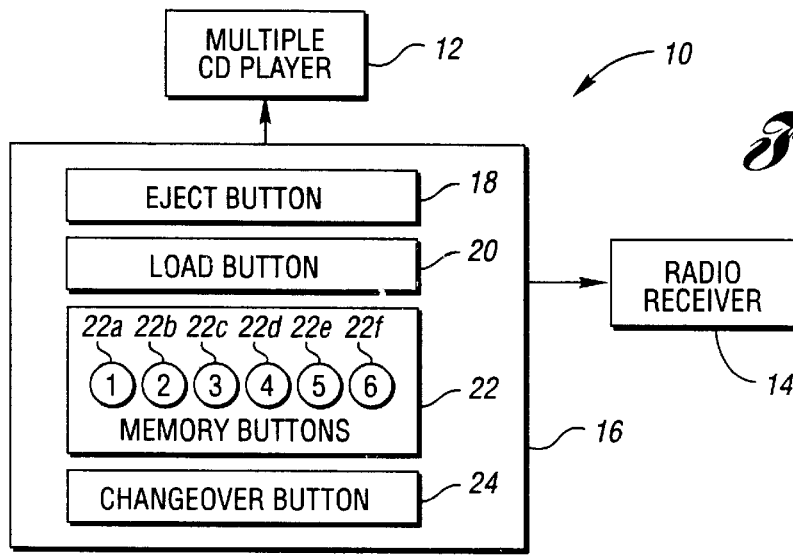
FIG. 1 illustrates a block diagram of a combined multiple CD player and radio receiver system in accordance with the present invention.

Referring now to FIG. 1, a combined multiple CD player and radio receiver system 10 for carrying out the method of the present invention is shown. System 10 is preferably an in-dash unit for an automobile. System 10 includes a multiple CD player 12, a radio receiver 14, and a controller 16.

Controller 16 includes an eject button 18, a load button 20, preferably six memory buttons 22(a–f), and a changeover button 24. Controller 16 controls system 10 via changeover button 24 to operate in either a CD or radio mode. In the CD mode, multiple CD player 12 plays a CD. In the radio mode, radio receiver 14 plays a selected radio station.

Multiple CD player 12 includes a magazine having n individual slots (not specifically shown) for storing n CDs where n is equal to the number of memory buttons. Each of memory buttons 22(a–f) correspond to a respective one of the slots. Thus, multiple CD player 12 is preferably a six disc CD player. Multiple CD player 12 is operable to play one CD on a slot at a time and to load and eject CDs from the other slots while the one CD is playing.

Figure 2:
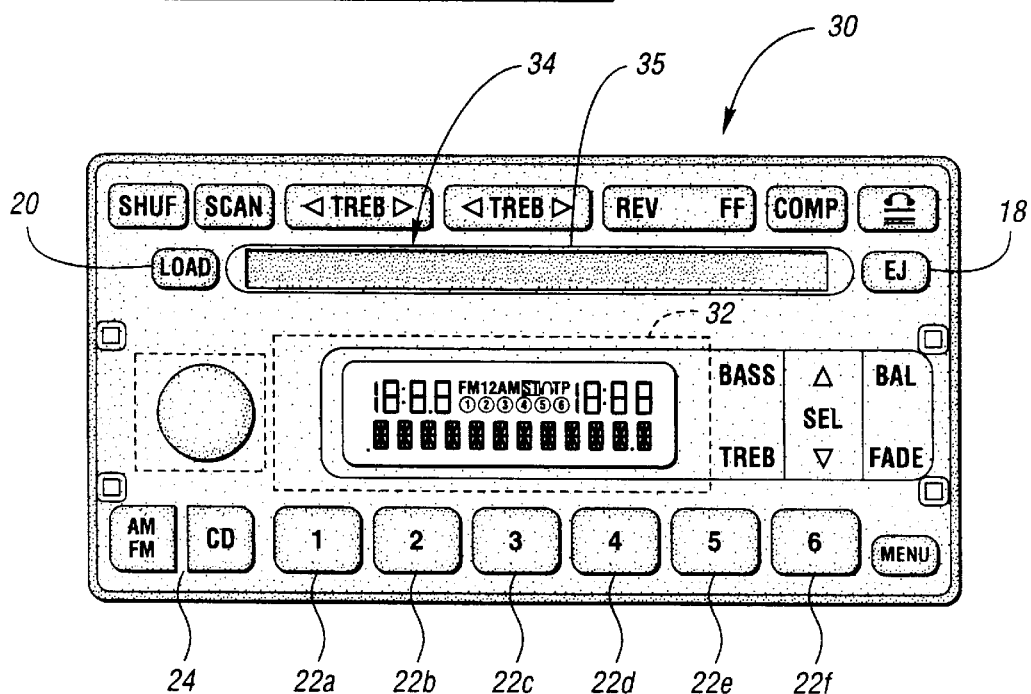
FIG. 2 illustrates a bezel for the combined multiple CD player and radio receiver system shown in FIG. 1.
Figure 3:
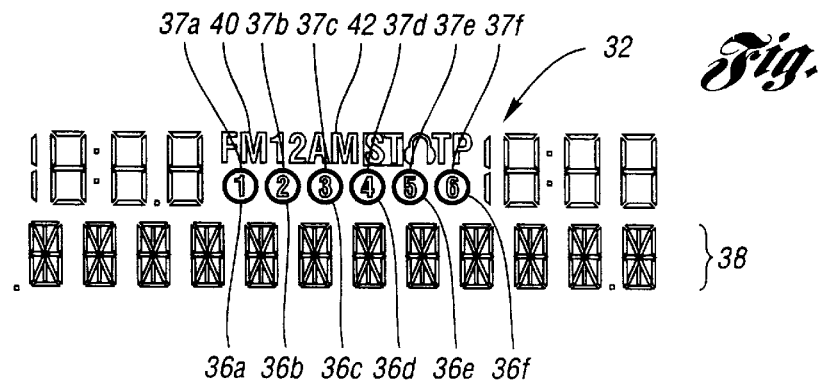
FIG. 3 illustrates a display area of the bezel shown in FIG. 2.

Referring now to FIGS. 2 and 3, with reference to FIG. 1, a bezel 30 for the combined multiple CD player and radio receiver system 10 is shown. Bezel 30 preferably sticks out of a dashboard of an automobile and provides a user with accessibility to eject button 18, load button 20, memory buttons 22(a–f), and changeover button 24. Bezel 30 also includes a single CD opening 34 for receiving and ejecting one CD at a time from multiple CD player 12. A door 35 is operable with CD opening 34 to provide and restrict access to CD opening 34.

To load a CD onto an empty slot of the magazine of multiple CD player 12, the user inserts a CD into CD opening 34. The magazine vertically moves within multiple CD player 12 to align the empty slot to be loaded with CD opening 34. The CD inserted into CD opening 34 is then pulled through the CD opening and pushed onto the empty slot to load the slot.

To eject a CD from a loaded slot, the magazine vertically moves to align the loaded slot to be emptied with CD opening 34. The CD on the loaded slot is then pulled off of the slot and pushed through CD opening 34 to empty the slot.

Bezel 30 further provides a display area 32 for the user. Display area 32 indicates to the user operating information of system 10. Display area 32 includes CD display circles 36(a–f). Inside CD display circles 36(a–f) are CD display numbers 37(a–f).

CD display circles 36(a–f) are continuously lighted except when the magazine is moving or when a CD is being loaded or unloaded from a slot. When the magazine is moving or when a CD is being loaded or unloaded, CD display circles 36(a–f) flash on and off in sequential order.

CD display numbers 37(a–f) correspond to respective slots of the magazine of multiple CD player 12. CD display numbers 37 corresponding to slots loaded with CDs are lighted to indicate to the user which slots of multiple CD player 12 are loaded. Correspondingly, CD display numbers 37 corresponding to empty slots are not lighted thereby indicating to the user which slots of multiple CD player 12 are empty.

Display area 32 further includes an information display area 38 for displaying to the user alphanumeric information regarding operation information of system 10. An FM display 40 on display area 32 lights up when system 10 is operating in the radio mode with FM reception. Similarly, an AM display 42 lights up when system 10 is operating in the radio mode with AM reception.

Controller 16 controls multiple CD player 12 and radio receiver 14 in accordance with selections made by a user by pressing the aforementioned buttons. Controller 16 allows the user to insert CDs into selected empty slots, eject CDs from selected loaded slots, automatically insert CDs into all of the empty slots, and automatically eject CDs from all of the loaded slots. The user can perform all of these functions by pressing eject button 18, load button 20, and memory buttons 22(*a–e*) in accordance with methods illustrated in FIGS. 4–8.

Figure 4:
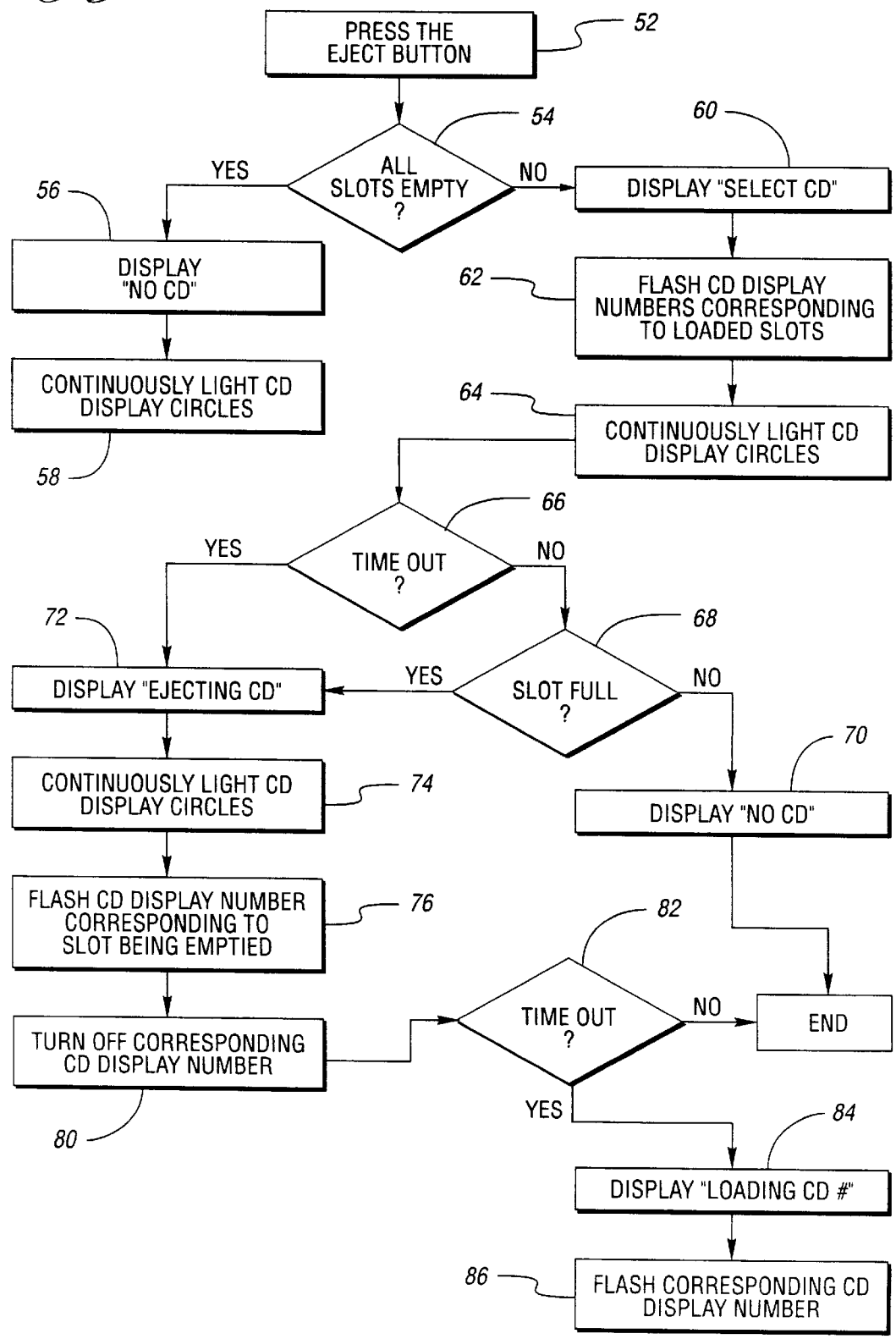

Referring now to FIG. 4, with continual reference to FIGS. 1–3, a flow diagram 50 illustrating operation for ejecting a single CD from multiple CD player 12 when system 10 is operating in either of the CD or radio modes is shown. Flow diagram 50 begins with the user pressing eject button 18 as shown by block 52. Decision block 54 then determines if all of the slots of the magazine of multiple CD player 12 are empty. If all of the slots are empty, then information display area 38 displays information such as "NO CD" as shown by block 56 to indicate to the user that all of the slots are empty. CD display circles 36(*a–f*) then continuously light as shown by block 58 to notify the user that the magazine is not moving and that multiple CD player 12 is not loading or unloading a CD from a slot.

If decision block 54 determines that at least one of the slots is loaded with a CD, then information display area 38 displays information such as "SELECT CD" as shown by block 60 to indicate to the user to select a slot in which the user wishes to eject a CD from. CD display numbers 37(*a–f*) corresponding to the loaded slots then flash as shown by block 62 to indicate to the user which slots are loaded. CD display circles 36(*a–f*) then continuously light as shown by block 64.

Decision block 66 then determines if a first time period has expired before the user has pushed a memory button 22(*a–f*). If the user pushes a memory button 22(*a–f*) before the first time period has expired, then decision block 68 determines if the slot corresponding to the pushed memory button is loaded with a CD. If the slot corresponding to the pushed memory button is empty, then information display area 38 displays information such as "NO CD" as shown by block 70 to indicate to the user that the selected slot is empty.

If decision block 68 determines that the selected slot is loaded with a CD, or if decision block 66 determines that the first time period has expired before the user has pushed a memory button 22(*a–f*), then the magazine moves to align the selected slot with CD opening 34. If a slot has not been selected by the user by pushing a memory button 22(*a–f*), then the selected slot is automatically the loaded slot corresponding to the last CD played by multiple CD player 12. The CD on the selected slot is then pulled off of the slot and pushed through CD opening 34. Information display area 38 then displays information such as "EJECTING CD" as shown by block 72 to notify the user that the selected slot is being emptied. CD display circles 36(*a–f*) then continuously light as shown by block 74. The CD display number 37(*a–f*) corresponding to the selected slot to be emptied then flashes as shown by block 76 as the ejected CD is pushed part way through CD opening 34 and hangs out of the CD opening. CD display number 37(*a–f*) corresponding to the selected slot then turns off as shown by block 80.

Decision block 82 then determines if a second time period has expired prior to the user removing the CD from CD opening 34. Decision block 82 makes this determination using sensors operable with CD opening 34 (not specifically shown). If the second time out period has expired, meaning that the CD has not been removed from CD opening 34, then the CD is automatically pulled back through the CD opening and pushed onto the selected slot to reload that slot.

Information display area 38 then displays information such as "LOADING CD" as shown by block 84 to notify the user that the CD is being reloaded into the selected slot. The CD display number 37(*a–f*) corresponding to the selected slot flashes as the slot is being reloaded as shown by block 86. If decision block 82 determines that the CD has been removed from CD opening 34 prior to the expiration of the time period, then flow diagram 50 terminates.

Referring now to FIG. 5, with continual reference to FIGS. 1–3, a flow diagram 110 illustrating operation for loading a single CD into multiple CD player 12 when system 10 is operating in either of the CD or radio modes is shown. Flow diagram 110 begins with the user pressing load button 20 as shown by block 112. Decision block 114 then determines if all of the slots of the magazine of multiple CD player 12 are loaded.

If all of the slots are loaded, then information display area 38 displays information such as "SLOTS FULL" as shown by block 116 to indicate to the user that all of the slots are loaded. CD display circles 36(*a–f*) then continuously light as shown by block 118.

If decision block 114 determines that at least one of the slots is empty, then information display area 38 displays information such as "SELECT SLOT" as shown by block 120 to indicate to the user to select an empty slot to load a CD onto. CD display numbers 37(*a–f*) corresponding to the empty slots then flash as shown by block 122 to indicate to the user which slots are empty. CD display circles 36(*a–f*) then continuously light as shown by block 124.

Decision block 126 then determines if a first time period has expired before the user has pressed a memory button 22(*a–f*). If the user presses a memory button 22(*a–f*) before the first time period has expired, then decision block 128 determines if the slot corresponding to the pressed memory button is empty. If the slot is loaded, then information display area 38 displays information such as "SLOT FULL" as shown by block 130 to indicate to the user that the selected slot is already loaded.

If decision block 128 determines that the selected slot is empty, or if decision block 126 determines that the first time period has expired before the user has pressed a memory button 22(*a–f*), then the magazine moves to align the selected empty slot with CD opening 34. If a slot has not been selected by the user by pushing a memory button 22(*a–f*), then the selected slot is automatically the empty slot corresponding to the lowest numerical CD display number.

While the magazine is moving, information display area 38 displays information such as "PLEASE WAIT" as shown by block 132 to notify the user to wait until the selected slot is properly aligned with CD opening 34 before inserting a CD into the CD opening. CD display circles 36(*a–f*) then continuously light as shown by block 134. CD display number 37(*a–f*) corresponding to the selected slot then flashes as shown by block 136. Information display area 38 then displays information such as "LOAD CD #" as shown by block 138 to notify the user to insert a CD into CD opening 34. At this time, door 35 is opened to provide access to CD opening 34.

Decision block 140 then determines if the user has inserted a CD into CD opening 34 to load onto the selected slot. Decision block 140 makes this determination using the sensors operable with CD opening 34 (not specifically shown). If a CD has been inserted into CD opening 34, then the corresponding CD display number 37(*a–f*) continuously lights as shown by block 142 once the selected slot is loaded. If a CD has not been inserted into CD opening 34 within a predetermined time period, then information display area 38 displays information such as "LOAD ABORTED" as shown by block 144.

Referring now to FIG. 6, with continual reference to FIGS. 1–5, a flow diagram 90 illustrating operation for ejecting and loading a single CD from and into multiple CD player 12 when system 10 is operating only in the CD mode is shown. Flow diagram 90 begins with the user selecting a slot to empty by pressing the corresponding memory button 22(*a–f*) for a predetermined time period as shown by block 92. Decision block 94 then determines if the pressed memory button 22(*a–f*) corresponds to a loaded slot.

If the pressed memory button 22(*a–f*) corresponds to a loaded slot, then flow diagram 90 continues with blocks 72, 74, 76, 78, and 80 to load a single CD as described in FIG. 4. Flow diagram 90 may then also continue with blocks 82, 84, and 86 (not specifically shown) as described in FIG. 4.

If the pressed memory button 22(*a–f*) does not correspond to a loaded slot, then flow diagram 90 continues with blocks 132, 134, 136, 138, 140, 141, 142, and 144 to eject a single CD as described in FIG. 5.

Referring now to FIG. 7, with continual reference to FIGS. 1–3, a flow diagram 160 illustrating operation for automatically ejecting all of the CDs stored in multiple CD player 12 when system 10 is operating in either of the CD or radio modes is shown. Flow diagram 160 begins with the user pressing and holding eject button 18 for a predetermined time period as shown by block 162. Decision block 164 then determines if all of the slots are empty. If all of the slots are empty, then information display area 38 displays information such as "NO CD" as shown by block 166 to indicate to the user that there are no CDs to eject. CD display circles 36(*a–f*) then continuously light as shown by block 168.

If decision block 164 determines that at least one of the slots is loaded with a CD, then information display area 38 displays information such as "AUTO EJECT" as shown by block 170 to indicate to the user that multiple CD player 12 is in the auto eject mode. CD display numbers 37(*a–f*) corresponding to the loaded slots then flash as shown by block 172. CD display circles 36(*a–f*) then continuously light as shown by block 174.

Information display area 38 then displays information such as "AUTO EJECT #" as shown by block 176 to indicate to the user that a loaded slot is being emptied. The magazine vertically moves to align the loaded slot with CD opening 34 to eject the CD. As the magazine is moving and the CD is being ejected the CD display number 37(*a–f*) corresponding to the slot being emptied flashes as shown by block 178. The CD display number 37(*a–f*) corresponding to the slot being emptied then turns off as shown by block 182.

Decision block 184 then determines if a first time period has expired prior to the user removing the CD from CD opening 34. If the first time out period has expired, meaning that the CD has not been removed from CD opening 34, then the CD is automatically pulled back through the CD opening and pushed onto the slot which was to be emptied to reload that slot.

Information display area 38 then displays information such as "LOADING CD" as shown by block 186 to notify the user that the slot is being reloaded with the CD. The CD display number 37(*a–f*) corresponding to the slot being reloaded flashes as the slot is being reloaded as shown by block 188.

If decision block 184 determines that the CD has been removed from CD opening 34 prior to the expiration of the first time period, then decision block 190 determines if any of the other slots are still loaded. If at least one slot is loaded, then blocks 170, 172, 174, 176, 178, 180, 182, and 184 repeat as shown in FIG. 7.

Referring now to FIG. 8, with continual reference to FIGS. 1–3, a flow diagram 200 illustrating operation for automatically loading all of the empty slots with CDs when system 10 is operating in either of the CD or radio modes is shown. Flow diagram 200 begins with the user pressing and holding load button 20 for a predetermined time period as shown by block 202. Decision block 204 then determines if all of the slots are loaded. If all of the slots are loaded, then information display area 38 displays information such as "SLOTS FULL" as shown by block 206. CD display circles 36(*a–f*) then continuously light as shown by block 208.

If decision block 204 determines that at least one of the slots is empty, then information display area 38 displays information such as "PLEASE WAIT" as shown by block 210 to indicate to the user that the magazine is moving to align an empty slot with CD opening 34. Once the empty slot is aligned with CD opening 34, information display area 38 displays information such as "AUTO LOAD #" as shown by block 212 to indicate to the user to insert a CD into the CD opening to load onto the empty slot. The CD display number 37(*a–f*) corresponding to the slot to be loaded then flashes as shown by block 214.

Decision block 216 then determines if a CD has been inserted into CD opening 34 prior to the expiration of a time period. If the time period has expired before a CD has been inserted into CD opening 34, then information display area 38 displays information such as "LOAD ABORTED" as shown by block 218 to indicate to the user that the auto load process has terminated. If a CD has been inserted prior to the expiration of the time period, then information display area 38 displays information such as "LOADING CD" as shown by block 220 to indicate to the user that a CD is being loaded onto the empty slot.

Decision block 222 then determines if any slots are empty. If at least one slot is empty, then blocks 210, 212, 214, and 216 repeat as shown in FIG. 9.

Thus, it apparent that there has been provided, in accordance with the present invention, a combined compact disc/radio system for an automobile and method of operation thereof that fully satisfies the objects, aims, and advantages set forth above.

While the best modes for carrying out the present invention have been described in detail, those familiar with the art to which the present invention relates will recognize various alternative designs and embodiments for practicing the present invention as defined by the following claims.

What is claimed is:

1. A method of ejecting and inserting compact discs in a combined multiple compact disc player and radio receiver system for an automobile, the system having a bezel provided with a load button, an eject button, a plurality of memory buttons, an information display area, and a compact disc opening, the multiple compact disc player includes a magazine having n individual slots for storing n compact discs wherein n is equal to the number of memory buttons, each of the slots corresponding to a respective one of the memory buttons, the method comprising:

pressing at least one of the eject button and the load button;

wherein in response to the eject button being pressed the method further includes:

identifying slots loaded with compact discs by illuminating the respective memory buttons;

selecting a slot to empty by pressing the respective memory button;

pushing the compact disc from the selected slot part way through the compact disc opening if the selected slot is loaded with a compact disc to eject the compact disc from the selected slot; and determining if the compact disc has been removed from the compact disc opening;

wherein in response to the load button being pressed the method further includes:

identifying empty slots by illuminating the respective memory buttons in response to the load button being pressed;

selecting a slot to load by pressing the respective memory button;

opening the door of the compact disc opening to receive a compact disc if the selected slot is empty;

determining if a compact disc has been inserted into the compact disc opening; and pulling the compact disc from the compact disc opening onto the empty slot if a compact disc has been inserted into the compact disc opening to load the compact disc into the selected slot.

2. The method of claim 1 further comprising:

displaying information on the information display area indicating that the selected slot is empty if the selected slot is determined to be empty.

3. The method of claim 1 further comprising:

displaying information on the information display area indicating that the compact disc from the selected slot has been pushed part way through the compact disc opening.

4. The method of claim 1 further comprising:

pulling the compact disc back pushed part way through the compact disc opening back onto the selected slot to reload the selected slot if the compact disc has been determined to be remaining in the compact disc opening.

5. The method of claim 1 further comprising:

displaying information on the information display area indicating that the selected slot is loaded if the selected slot is determined to be loaded.

6. The method of claim 1 further comprising:

displaying information on the information display area indicating that the compact disc opening is to receive a compact disc.

* * * * *